Patented Aug. 7, 1928.

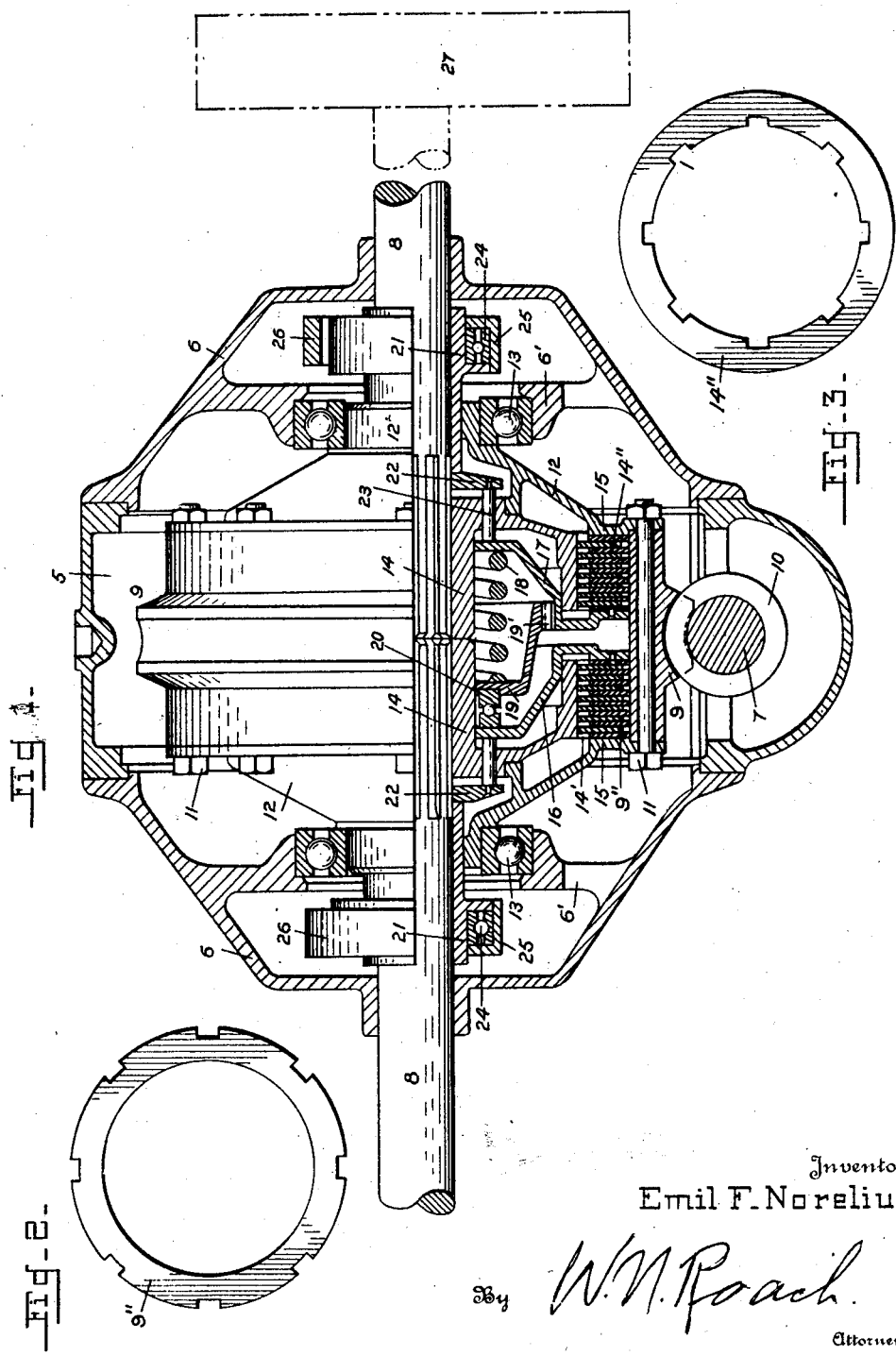

1,679,584

UNITED STATES PATENT OFFICE.

EMIL F. NORELIUS, OF DAVENPORT, IOWA.

CONTROL UNIT.

Application filed October 12, 1925. Serial No. 62,205.

(GRANTED UNDER THE PROVISIONS OF THE ACT OF MARCH 3, 1883, 22 STAT. L., 625, AS AMENDED BY THE ACT OF APRIL 30, 1928.)

The invention described herein may be manufactured and used by or for the Government for governmental purposes without the payment to me of any royalty thereon.

This invention relates to a control unit particularly applicable to vehicles of the tractor type in which traction is applied to the ground through parallel self-laying tracks.

In vehicles of this type, steering is effected by holding one track while the other is being driven or by driving the two tracks at different speeds. One method of independently controlling the tracks consists in interposing a clutch or clutch brake between the drive mechanism and each track.

The improvement contemplated in the present invention consists in more intimately associating the clutches and driving mechanisms by arranging the clutches within the reduction unit of the power transmission so as to be capable of directly transmitting the power from the reduction unit to the counter-shafts.

Another equally important object is to provide a single spring for holding the elements of both clutches in engagement and to include means for preventing winding and unwinding motion being transmitted to the spring due to relative movement of the pressure plates of the clutch units.

A further object is to provide improved means for disengaging the clutches which are operable from an accessible position at either side of the reduction unit.

The compact structure of the present control unit renders it particularly adaptable for application when, in converting a vehicle, such for example as the Fordson tractor, from wheel traction to belt traction, it is necessary to provide steering means which it is desired will not interfere with the standard construction of the vehicle nor require modification of the power connections except removal of the rear assembly as an entity for which the present control unit is substituted.

To these and other ends, my invention consists in the construction, arrangement, and combination of elements, described hereinafter and pointed out in the claims forming a part of this specification.

A practical embodiment of the invention is illustrated in the accompanying drawings, wherein:

Fig. 1 is an elevational view partly in section of a central control unit constructed in accordance with the invention; and Figs. 2 and 3 are reduced detail views of the alternate ring plates of the clutch unit.

Referring to the drawings by numerals of reference:

The mounting for the central control unit of which the steering clutches form a vital part corresponds to the mounting of a differential in the rear axle of the conventional automobile for which it is adapted and may be substituted when converting an ordinary wheeled vehicle into a track laying vehicle.

The mounting consists of a central housing 5 carried between axle housings 6—6 which may be conveniently supported by attachment to the truck frames in such a manner as to provide a yielding or flexible suspension for the rear end of the chassis. Within the central housing is the control unit receiving movement from the main shaft 7 leading from a source of power (not shown).

The control unit by means of which power is transmitted from the main shaft to the track driving countershafts 8—8 within the axle housings consists of a reduction wheel 9 suitably geared to the main shaft, specifically by the worm drive 10. For convenience in assembling and mounting, the wheel 9 is secured by means of bolts 11 to a pair of discs 12 whose hubs 12′ are disposed in bearings 13 mounted on internal annular seats 6′ of the axle housings 6.

Within the reduction wheel are a pair of driving spiders 14—14 splined or keyed on the proximate ends of the shafts 8—8, and their hubs held in abutting engagement at the center line of the vehicle by projecting annular ribs 12″ on the discs 12.

The inner and outer peripheries respectively of the wheel 9 and the driving spiders 14 are provided either integrally or separately with transverse teeth 9′ and 14′. Interposed between the wheel and each spider is a friction clutch 15, one being provided for controlling the right hand track and the other for the left hand track. The clutches are similar in all respects, each consisting of a series of ring plates 9″ and 14″ alternately engaging the teeth 9′ and 14′ and correspondingly slotted on their outer and inner peripheries. When the series is compressed so that the alternate rings are in frictional engagement power will be transmitted from the rotating wheel 9 to revolve the driving spider 14 and the shaft 8 on which it is mounted, but when the alternate rings are not in engagement the driving rings 9″ are free to slip between the driven rings 14″, so that while the wheel 9 continues its rotation by reason of its direct connection with the main shaft 7, the spiders 14 and their countershafts 8 will selectively be rendered inoperative.

Each series of ring plates is confined between the margins of the discs 12 and the margins of pressure plates 16 and 17 which are disposed between the driving spiders and encircle their hubs. A single spring 18 also encircling the hubs of the spiders and interposed between the pressure plates is provided for transmitting pressure equally to each clutch series to normally hold the alternate rings in frictional driving engagement.

However, in order to prevent winding or unwinding motion from being transmitted to the spring, due to relative movement between the pressure plates when one clutch is disengaged, there is provided an intermediate plate 19 formed with teeth 19′ on its outer periphery which mesh with teeth on the inner periphery of the pressure plate 17 so that while rotatable with the pressure plate it is capable of lateral sliding movement with respect thereto. This member actually serves to confine one end of the spring whose force it transmits to the pressure plate 16 through a thrust bearing 20.

Means for shifting the pressure plates 16 and 17 to disengage the clutches are conveniently arranged for actuation exteriorly of the control unit and consists in each case of a shifting sleeve 21 embracing the shaft 8 and extending through the hub of the disc 12 where it abuts against a washer 22 slidably mounted on the shaft between the disc 12 and driving spider 14. Secured to the washer are a number of plunger rods 23 inserted through apertures in the spider to contact the corresponding pressure plates.

Inward movement is imparted to the sleeve 21 through a bearing 24 and a ring 25 which is controlled by a suitable connection 26 with a steering wheel or lever at the operator's seat.

Service brakes 27 on the shafts 8 may be used to assist in proper steering.

In operation, the vehicle will normally proceed on a straight course since both clutches 15 of the control unit are held in driving engagement by the spring 18 acting on the pressure plates 16 and 17. When it is desired to turn the vehicle to the right or left the corresponding clutch is disengaged to disconnect the power transmission between the reduction wheel 9 and the countershaft 8 on the pivot side of the vehicle.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claims.

I claim:

1. A control unit for power vehicles embodying a pair of counter-shafts, a reduction wheel mounted to revolve about the proximate ends of said shafts, a power connection for said wheel, a pair of driving spiders disposed within the wheel and secured each to one of the shafts, a multiple ring friction clutch interposed between the wheel and each spider, the rings of said clutch alternately engaging the wheel and spider, clutch pressure plates mounted between the spiders, an intermediate plate geared to one of said pressure plates, a thrust bearing interposed between said intermediate plate and the other pressure plate, a single spring confined between the intermediate plate and the pressure plate to which it is geared, said spring normally holding both clutches in driving engagement, a shifting sleeve mounted on each shaft and extending through the hub of the wheel, a slidable washer embracing the shaft between the inner end of the sleeve and the spider, plunger rods on the washer and inserted through apertures in the spider to contact the pressure plate, and means exterior of the wheel for moving the shifting sleeves inwardly to disengage the clutch.

2. A control unit for power vehicles embodying a pair of countershafts, a reduction wheel mounted to revolve about the proximate ends of said shafts, a power connection for said wheel, a pair of driving spiders disposed within the wheel and secured each to one of the shafts, a multiple ring friction clutch interposed between the wheel and each spider, the rings of said clutch alternately engaging the wheel and spider, clutch pressure plates mounted between the spiders, a single spring between the pressure plates for normally holding the clutches in driving engagement, a laterally slidable intermediate member rotatably fixed to one plate and movable with respect to the other for transmitting the force of the spring to said other plate, and means operable from a point exterior of the wheel for disengaging the clutches.

3. A control unit for power vehicles embodying a pair of countershafts, a reduction wheel mounted to revolve about the proximate ends of said shafts, a power connection for said wheel, a pair of driving spiders disposed within the wheel and secured each to one of the shafts, a multiple ring friction clutch interposed between the wheel and each spider, the rings of said clutch alternately engaging the wheel and spider, clutch pressure plates mounted between the spiders, a single spring between the pressure plates for normally holding the clutches in driving engagement, means for preventing winding and unwinding motion being imparted to the spring due to relative movement between the pressure plates, and means operable from a point exterior of the wheel for disengaging the clutches.

4. A control unit for power vehicles embodying a pair of counter-shafts, a reduction wheel mounted to revolve about the proximate ends of said shafts, a power connection for said wheel, a pair of driving spiders disposed within the wheel and secured each to one of the shafts, a multiple ring friction clutch interposed between the wheel and each spider, the rings of said clutch alternately engaging the wheel and spider, clutch pressure plates mounted between the spiders, spring means between the pressure plates for normally holding the clutches in driving engagement, means for preventing winding or unwinding motion being imparted to said spring means due to relative movement between the pressure plates, and means operable from a point exterior of the wheel for disengaging the clutches.

5. A control unit for vehicles embodying a pair of counter-shafts, a reduction wheel mounted to revolve about the proximate ends of said shafts, a power connection for said wheel, a pair of driving spiders disposed within the wheel and secured each to one of the shafts, a multiple ring friction clutch interposed between the wheel and each spider, the rings of said clutch alternately engaging the wheel and spider, clutch pressure plates mounted between the spiders, spring means between the pressure plates for normally holding the clutches in driving engagement, and means operable from a point exterior of the wheel for disengaging the clutches, said means including a shifting sleeve mounted on each shaft and extending through the hub of the wheel, a slidable washer embracing the shafts between the inner end of the sleeve and spider, plunger rods on the washer and inserted through apertures in the spider to contact the pressure plates, and means for moving the sleeve inwardly.

6. A control unit for vehicles embodying a pair of counter-shafts, a reduction wheel mounted to revolve about the proximate ends of said shafts, a power connection for said wheel, a pair of driving spiders disposed within the wheel and secured each to one of the shafts, a multiple ring friction clutch interposed between the wheel and each spider, the rings of said clutch alternately engaging the wheel and spider, clutch pressure plates mounted between the spiders, spring means between the pressure plates for normally holding the clutches in driving engagement, means operable from a point exterior of the wheel for disengaging the clutches, said means including a shifting sleeve mounted on each shaft and extending through the hub of the wheel, a member establishing connection between the sleeve and pressure plate, and means for moving the sleeve inwardly.

7. A control unit for vehicles embodying a pair of countershafts, a reduction wheel mounted to revolve about the proximate ends of said shafts, a power connection for said wheel, a pair of driving spiders disposed within the wheel and secured each to one of the shafts, a multiple ring friction clutch interposed between the wheel and each spider, the rings of said clutch alternately engaging the wheel and spider, clutch pressure plates mounted between the spiders, spring means between the pressure plates for normally holding the clutches in driving engagement, means operable from a point exterior of the wheel for disengaging the clutches, said means including a shifting sleeve mounted on each shaft and extending within the wheel.

8. A pair of selectively rotatable members mounted for sliding movement on a common axis, a spring between the members, a laterally slidable intermediate member rotatably fixed to one of said pair of members and movable with respect to the other member for transmitting the force of the spring to said other member.

9. A pair of selectively rotatable members mounted for sliding movement on a common axis, a tension element for normally holding each of said members in outermost position, and pressure transmitting means held positively to but one of said members for preventing winding and unwinding motion being transmitted to the tension element due to relative movement between said members.

EMIL F. NORELIUS.